(12) United States Patent
Bowe

(10) Patent No.: US 9,016,707 B2
(45) Date of Patent: Apr. 28, 2015

(54) ELECTRICAL MOUNTING BRACKET FOR HITCH

(75) Inventor: Curtis M. Bowe, Chippewa Falls, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 106 days.

(21) Appl. No.: 13/601,337

(22) Filed: Aug. 31, 2012

(65) Prior Publication Data

US 2013/0049327 A1 Feb. 28, 2013

Related U.S. Application Data

(60) Provisional application No. 61/529,733, filed on Aug. 31, 2011.

(51) Int. Cl.
*B60D 1/62* (2006.01)
*B60D 1/64* (2006.01)

(52) U.S. Cl.
CPC .. *B60D 1/64* (2013.01); *B60D 1/62* (2013.01); *Y10T 29/49002* (2015.01); *H01R 2201/26* (2013.01)

(58) Field of Classification Search
CPC ......... B60D 1/62; B60D 1/64; H01R 2201/26
USPC ............ 280/409, 420–422, 504, 514; 439/35, 439/527
See application file for complete search history.

(56) References Cited

U.S. PATENT DOCUMENTS

| | | | | |
|---|---|---|---|---|
| 3,858,907 A * | 1/1975 | Van Raden | ..................... | 280/422 |
| 4,066,996 A * | 1/1978 | Davis | ............................. | 340/431 |
| 4,747,506 A * | 5/1988 | Stuchlik, III | ................... | 220/3.9 |
| 4,781,393 A * | 11/1988 | Jeter | ............................ | 307/10.1 |
| 5,288,094 A | 2/1994 | Putnam | | |
| 5,407,219 A * | 4/1995 | Chiu | .............................. | 280/422 |
| 5,443,389 A * | 8/1995 | Hughes | ........................... | 439/35 |
| 5,593,170 A * | 1/1997 | Chiu | .............................. | 280/422 |
| 5,765,848 A * | 6/1998 | Silvey | ........................... | 280/422 |
| 5,904,261 A | 5/1999 | Belinky et al. | | |
| 6,019,386 A | 2/2000 | Morelock | | |
| 6,076,691 A * | 6/2000 | Belinky et al. | ................. | 220/3.9 |
| 6,080,014 A * | 6/2000 | Steiler | ........................... | 439/574 |
| 6,089,907 A | 7/2000 | Shoblom | | |
| 6,095,546 A * | 8/2000 | Austin | ......................... | 280/507 |
| 6,125,945 A * | 10/2000 | Skaggs et al. | ................. | 172/439 |
| 6,846,001 B2 | 1/2005 | Seksaria et al. | | |
| 8,215,656 B1 * | 7/2012 | Kaminski et al. | ............. | 280/422 |
| 8,414,011 B2 * | 4/2013 | Dague et al. | .................. | 280/500 |

(Continued)

FOREIGN PATENT DOCUMENTS

JP 2002331970 A * 11/2002 ............. B62D 53/00

*Primary Examiner* — Anne Marie Boehler
*Assistant Examiner* — Maurice Williams
(74) *Attorney, Agent, or Firm* — Shewchuk IP Services, LLC; Jeffrey D. Shewchuk

(57) ABSTRACT

A mounting bracket cantilevers a support arm off the side of a receiver tube of a hitch, using flats on the receiver tube or receiver tube lip to support the cantilevered weight. The support arm is configured to receive and support one or more mating electrical connection structures, with a plug/unplug direction matching the fore/aft direction of the towing vehicle. Flanges of the mounting bracket are pulled toward each other around the receiving tube using mounting bolts which extend on right and left sides of the receiving tube. The mounting bracket is preferably formed from stamped and bent sheet metal.

16 Claims, 6 Drawing Sheets

(56) References Cited

U.S. PATENT DOCUMENTS

| | | | |
|---|---|---|---|
| 2001/0050471 A1* | 12/2001 | McCoy et al. | 280/504 |
| 2008/0113522 A1* | 5/2008 | Wagner | 439/35 |
| 2009/0181555 A1* | 7/2009 | Cummings et al. | 439/35 |
| 2010/0144197 A1 | 6/2010 | Rotenberg et al. | |
| 2010/0213687 A1* | 8/2010 | McDaniel et al. | 280/491.2 |
| 2012/0024081 A1* | 2/2012 | Baker | 73/862.338 |

* cited by examiner

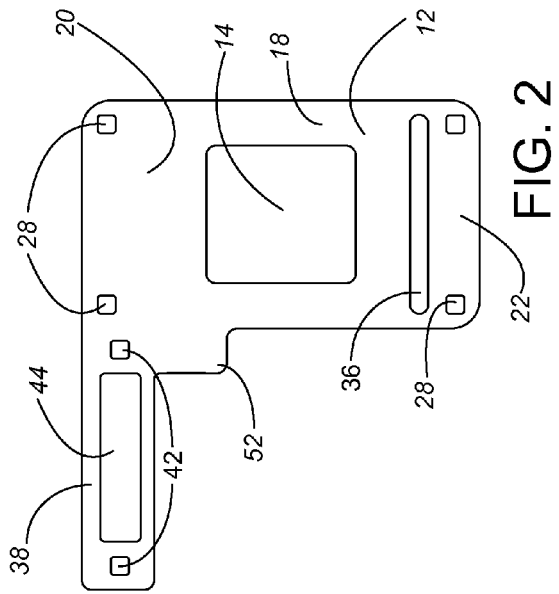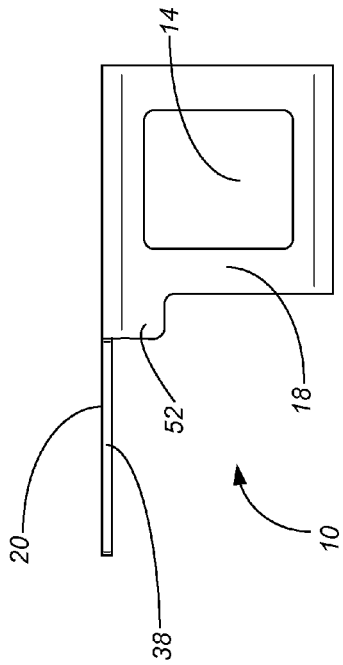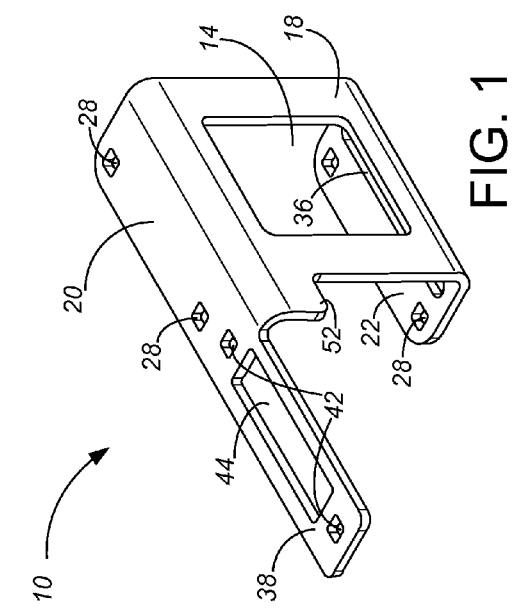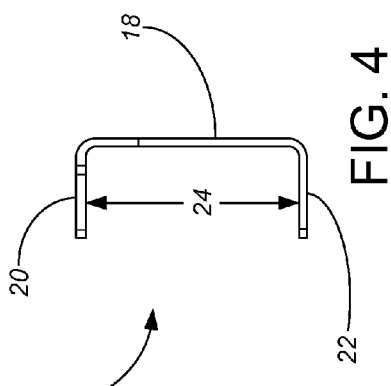

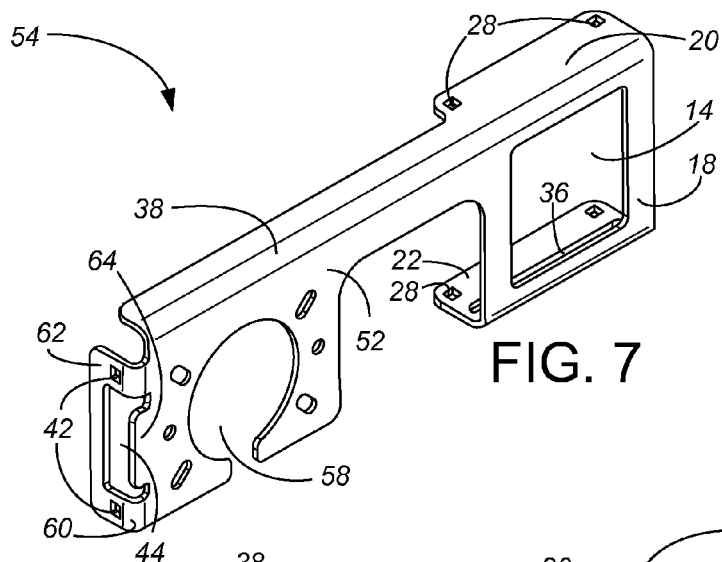
FIG. 7
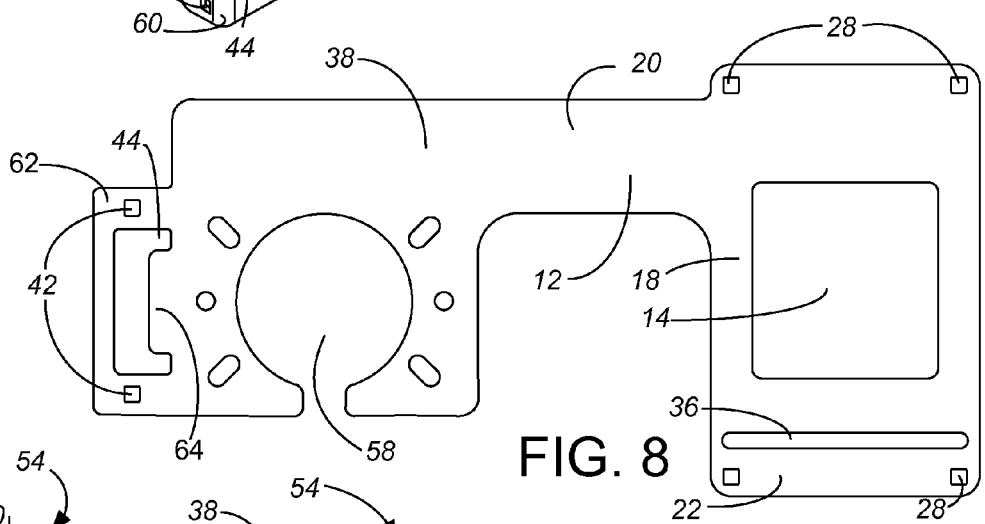
FIG. 8
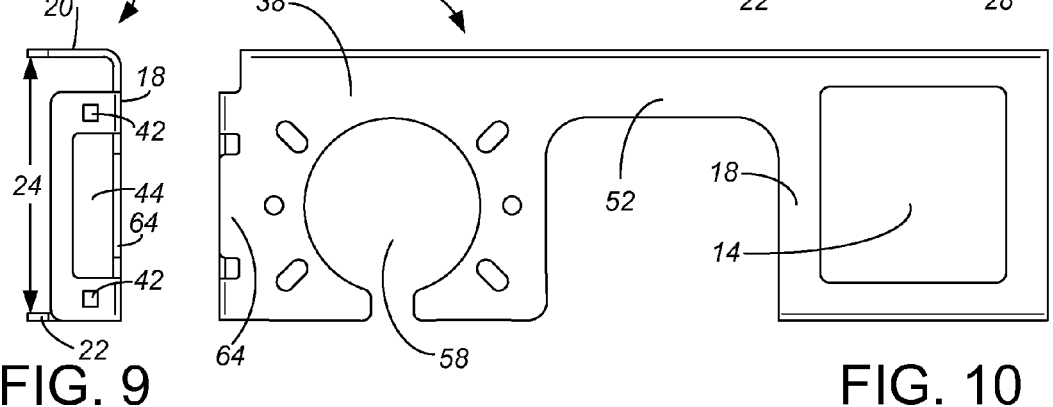
FIG. 9
FIG. 10

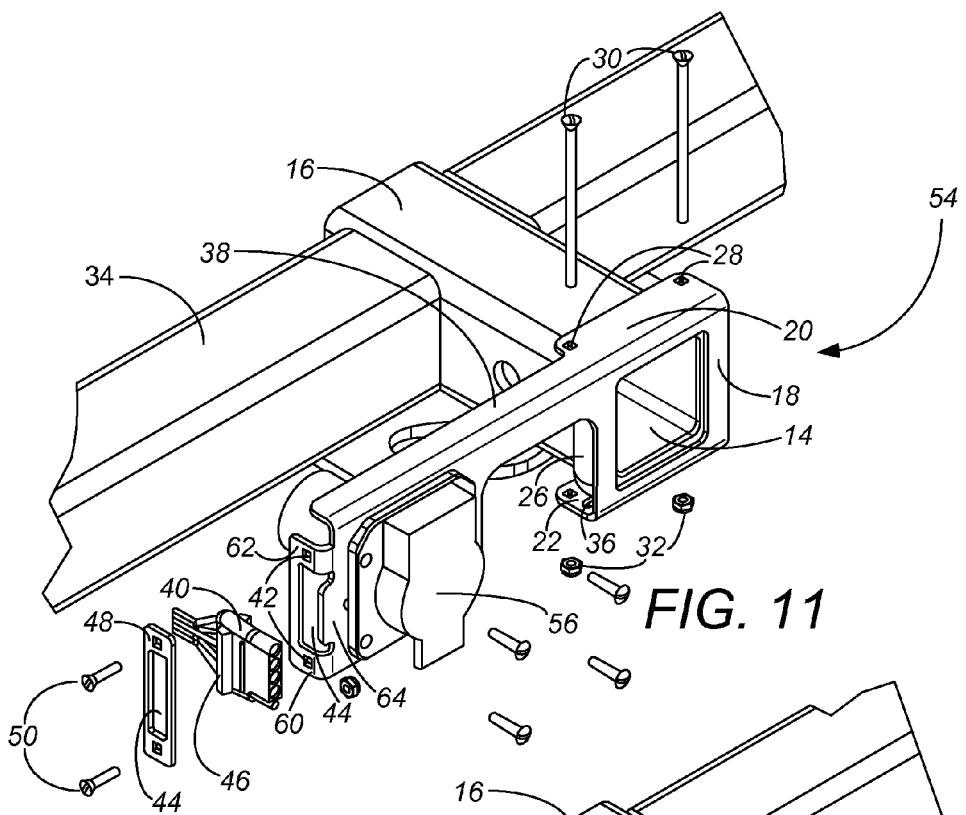
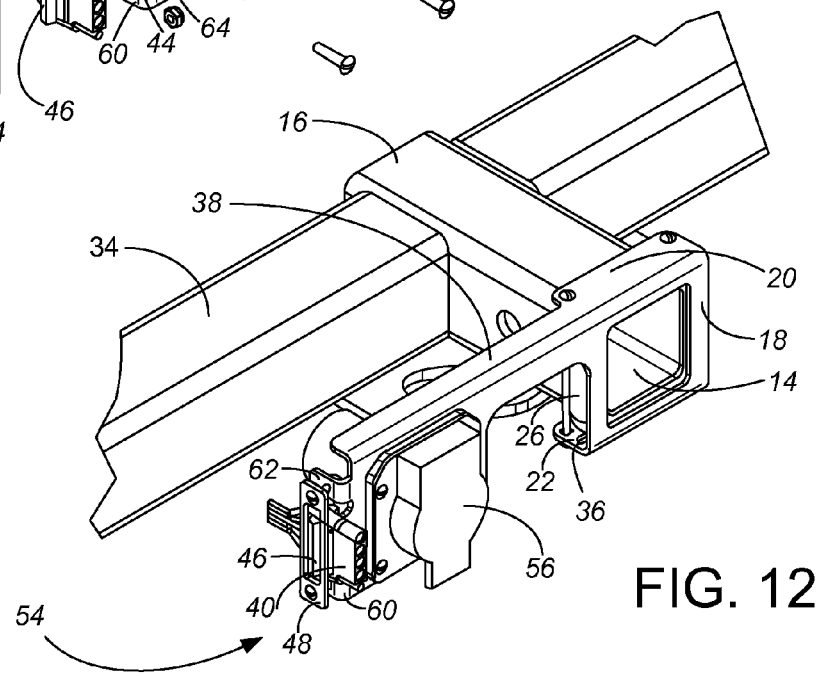

ELECTRICAL MOUNTING BRACKET FOR HITCH

CROSS-REFERENCE TO RELATED APPLICATION(S)

The present application claims the benefit of U.S. Provisional Pat. App. Ser. No. 61/529,733, filed Aug. 31, 2011. The contents of U.S. Provisional Pat. App. Ser. No. 61/529,733 are hereby incorporated by reference in entirety.

BACKGROUND OF THE INVENTION

Towed loads such as trailers often include an electrical connection from the towing vehicle, for operating devices such as tail lights, brake controls or other electrical devices on the towed load during towing and based upon electrical signals or electrical power from the towing vehicle. Often the mounting arrangement for supporting the electrical connections does not keep the electrical connections in a position which is both good for towing and good for disconnection and reconnection. The present invention relates to hitches for towing loads off the back of vehicles, and particularly in situations wherein electrical circuits are connected between the towing vehicle and the towed load.

In many situations, the electrical wiring connections between the towing vehicle and the towed trailer are just completed on an ad hoc basis. In other situations, hanger structures are provided to assisting in supporting the wires from the trailer hitch structure, possibly also providing a location to have a socket connection for the wiring which can easily be disconnected and reconnected. Examples of brackets for hanging the electrical connectors from the hitch are disclosed in U.S. Pat. Nos. 5,288,094, 5,904,261, 6,019,386, 6,089,907 and 6,846,001, each incorporated by reference.

While these structures offer various hanger solutions, none are ideal. For instance, the hanger structure in U.S. Pat. No. 6,846,001 is welded to the hitch cross bar, so it cannot be removed or replaced. Like that of U.S. Pat. No. 6,846,001, the structure of U.S. Pat. No. 5,288,094 positions the connection in plane with and underneath the hitch cross-bar, which for many vehicles is inconveniently far forward, making access to connect and disconnect the socket more difficult than it needs to be. The structures of U.S. Pat. Nos. 5,904,261 and 6,089,907 project slightly rearward from the back face of the hitch cross-bar, but also align the electrical connection so the socket plugging direction is at an angle to the towing direction. A further solution proposed in U.S. Pat. No. 6,019,386 involves a molded receiver tube protective cover included a seat for holding a flat electrical socket hung off the bottom of the cover. However, this location under the receiver tube is difficult to access and becomes more difficult after a hitching structure such as a hitch ball is inserted into the receiver tube. Better and more convenient and cost effective solutions are needed.

BRIEF SUMMARY OF THE INVENTION

The present invention is a mounting bracket which is cantilevered off the side of a receiver tube of a hitch. Such receiver tubes typically have a generally rectangular (usually square) configuration, including a top flat and a bottom flat on the receiver tube or receiver tube lip. The mounting bracket biases off the top and bottom flats to cantilever a support arm to the side of the receiver tube, and the support arm is configured to receive and support one or more mating electrical connection structures. In the preferred embodiment, top and bottom flanges of the mounting bracket are pulled toward each other around the receiving tube using mounting bolts which extend from the top flange to the bottom flange on right and left sides of the receiving tube. The mounting bracket is preferably formed from stamped and bent sheet metal, providing a low cost electrical mounting solution.

BRIEF DESCRIPTION OF THE DRAWINGS

FIG. 1 is a perspective view showing a first embodiment of an electrical mounting bracket the present invention;

FIG. 2 is a plan view showing a stamping used to create the electrical mounting bracket of FIG. 1;

FIGS. 3 and 4 are a rear face view and a side view of the electrical mounting bracket of FIG. 1, formed by bending of the stamping of FIG. 2;

FIG. 7 is a perspective view showing a second embodiment of an electrical mounting bracket the present invention;

FIG. 8 is a plan view showing a stamping used to create the electrical mounting bracket of FIG. 2; and FIGS. 9 and 10 are a rear face view and a side view of the electrical mounting bracket of FIG. 7, formed by bending of the stamping of FIG. 8.

FIG. 11 is a perspective assembly view of the electrical mounting bracket of FIGS. 7-10, shown in relation to a hitch having a receiver tube;

FIG. 12 is a perspective view showing the electrical mounting bracket of FIGS. 7-11 assembled onto the hitch.

Figure 5:
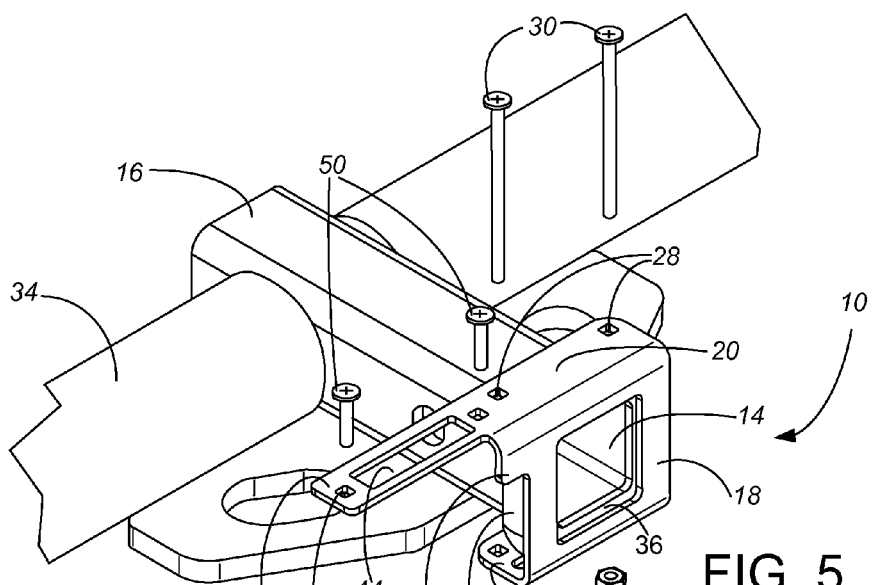
FIG. 5 is a perspective assembly view of the electrical mounting bracket of FIGS. 1-4, shown in relation to a hitch having a receiver tube.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

FIGS. 1-6 show a first embodiment of an electrical mounting bracket 10 in accordance with the present invention. As best understood with reference to FIG. 2, the electrical mounting bracket 10 is preferably stamped from flat sheet metal to form a stamping 12. The primary opening in the stamping 12 is a receiving tube opening 14 sized to mate with standard receiving tubes 16 used in the hitch industry, such as a 1¼×1¼ inch receiver tube or a 2×2 inch receiver tube. As drawn, this embodiment corresponds to a 1¼×1¼ inch receiver tube 16 (shown in FIGS. 5 and 6). The preferred receiving tube opening 14 is actually slightly larger than the inner size of the receiving tube 16, such as about 0.2 inch clearance in length and width larger than the standard receiving tube inner dimensions. This gives the receiving tube opening 14 a sufficient (0.1 inch) gap, on all four sides, to avoid interfering with insertion of the ball mount or other hitching structure (not shown) into the receiver tube 16. The preferred mounting bracket 10 includes a face 18 which encircles the receiving tube opening 14.

The stamping 12 is horizontally bent above and below the receiving tube opening 14 at generally right angles, such as with a 0.13 inch radius. Once bent, the mounting bracket 10 has a top flange 20 and a bottom flange 22 with a gap 24 (shown in FIG. 4) therebetween sized to mate around the outside of the lip 26 of the receiving tube 16. For a 1¼×1¼ inch receiver tube this gap 24 is about 2.225 inches. In the preferred embodiment of FIGS. 1-6, the top flange 20 and the bottom flange 22 have a width of about an inch, i.e., the total depth of the bracket 10 as shown in FIG. 4 is slightly over an inch. Alternatively or in addition to the top and bottom flanges 20, 22, the mounting bracket 10 could be provided with vertically extending side flanges (not shown). Forming the mounting bracket 10 with only a top flange 20 and a bottom flange 22 simplifies the bending operation used to form the mounting bracket 10.

The mounting bracket 10 is formed of an acceptable material and low cost manufacturing method, such as being stamped and bent out of 13 gauge (0.094 inch thick) plate steel, preferably ASTM A36 hot rolled carbon steel. The sheet metal is preferably finished for an attractive appearance and for corrosion resistance, such as by deburring the edges and finishing with an e-coat and/or powder coat as commonly used in the hitching industry.

Figure 6:
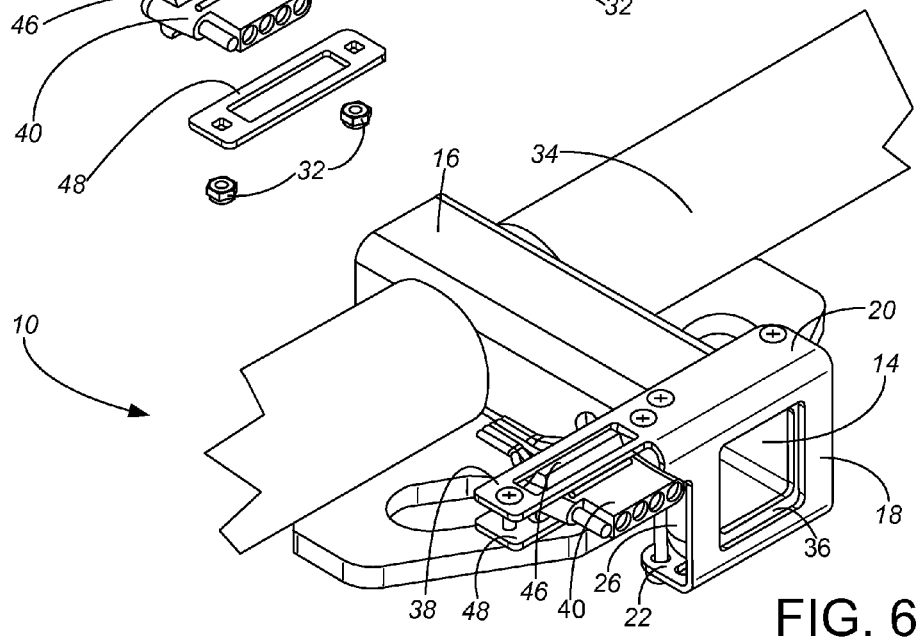
FIG. 6 is a perspective view showing the electrical mounting bracket of FIGS. 1-5 assembled onto the hitch.
Figure 13:
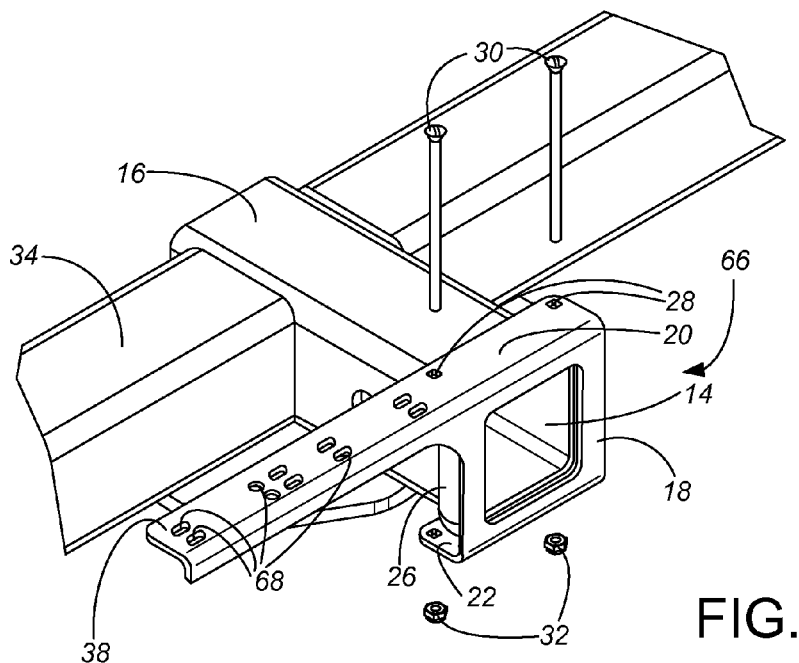
FIG. 13 is a perspective assembly view of a third preferred embodiment of the electrical mounting bracket of the present invention, shown in relation to a hitch having a receiver tube.
Figure 14:
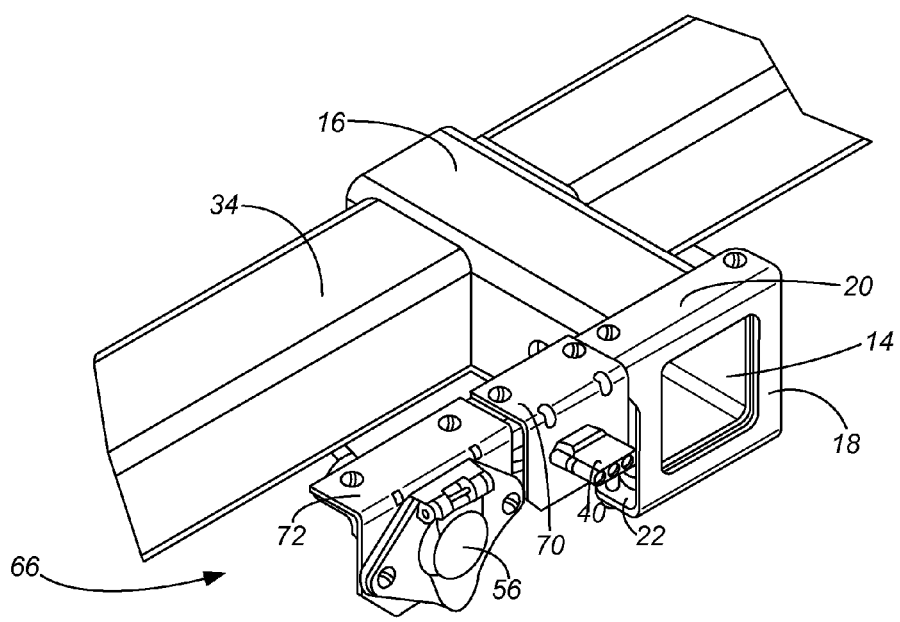
FIGS. 14-16 are perspective views showing various sockets attached to the electrical mounting bracket of FIG. 13.
Figure 15:
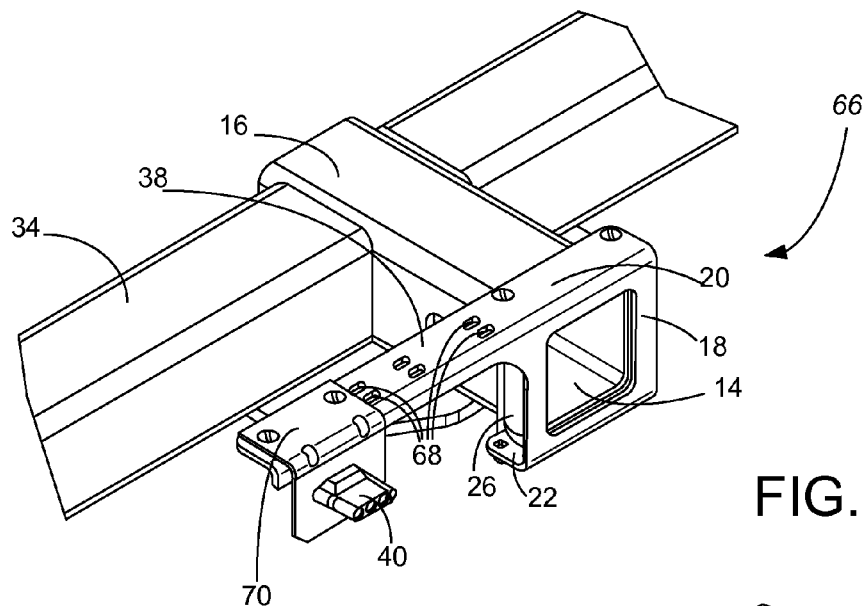

Bolt openings 28 are aligned in the top flange 20 and bottom flange 22 to receive bolts 30 around the receiving tube 16. In the preferred embodiment, these bolt openings 28 are located a significant distance, such as ⅔ of an inch, offset from the face 18 of the bracket 10. As shown in FIGS. 5 and 6, two bolts 30 are inserted into these bolt openings 28 to attach the bracket 10 to the receiving tube 16. The bolt orientation and spacing is preferably on opposing sides around the receiving tube opening 14, but close enough to the receiving tube opening 14 so the bolt spacing is narrower than the width of the lip 26 of the receiving tube 16, with the preferred bolt spacing being about ⅓ of an inch wider on each side than the receiving tube opening 14. The offset of the bolt openings 28 relative to the face 18 of the bracket 10 results in the bolts 30 being out-of-plane relative to the lip 26 of the receiving tube 16. The preferred bolts 30 are #8-32×2⅝ inch stainless steel carriage bolts. The carriage bolts 30 can drop down (i.e., head up/nut down) into the bolt openings 28 as shown in FIGS. 5 and 6 if space permits relative to the bumper or other overhanging structure (not shown) of the towing vehicle. Alternatively, the bolts 30 may be inserted from below (i.e., nut up/head down). As another alternative, the bracket can be formed with vertically oriented flanges (not shown) on the sides of the receiving tube opening 14, and the bolt orientation turned so one bolt extends horizontally above the receiving tube 16 and another bolt extends horizontally under the receiving tube 16. The bolts 30 are tightened on such as with correspondingly sized stainless steel jam nylock nuts 32. The bolts 30 and nuts 32 cooperate to clamp the mounting bracket 10 tightly onto the receiving tube 16 and somewhat around the receiving tube lip 26, with the top and bottom flanges 20, 22 of the mounting bracket 10 pulled toward each other around the receiving tube 16. With this "pulled around" style of tightening, the gap 24 between the top and bottom flanges 20, 22 supports a very wide tolerance for different dimensions of lips 26 on different manufacturers' and different models of hitches 34. Once inserted and tightened, the bolts 30 prevent the mounting bracket 10 from slipping rearward off the end of the receiving tube 16, because the receiving tube lip 26 interferes with the bolt locations before rearward slippage can happen.

The bottom flange 22 also preferably includes a lip receiving slot 36. This lip receiving slot 36 mates with the lip 26 of the receiving tube 16, to better position and hold the bracket 10 from side to side and fore and aft. The preferred lip receiving slot 36 extends for about ⅓ inch on each side beyond the width of the receiving tube opening 14, so as to have a slightly smaller width than the lip 26 of the receiving tube 16. The preferred lip receiving slot 36 is also slightly smaller than the depth of the lips 26 on most receiving tube 16, so the lip receiving slot 36 receives only a portion of the lip 26 for positioning. Alternatively, the lip receiving slot 36 could be wider and deeper than the bottom portion of the lip 26 so as to fully circumscribe the lip 26 without interference. Alternatively or in conjunction with the lip receiving slot 36 in the bottom flange 22, a lip receiving slot (not shown) could be formed in the top flange 20, and/or one or two lip receiving slots (not shown) could be used on vertically oriented flanges (not shown) on the sides of the receiving tube opening 14.

The interaction of the top flange 20 with the horizontally extending flat of the receiving tube lip 26 and of the bottom flange 22 with the horizontally extending flat of the receiving tube lip 26 enables the bracket 10 to support a moment relative to the receiving tube 16, such that a side arm 38 can be cantilevered off the side of the receiving tube 16. The noun "flat" as used herein is not limited to planar structures having a length and a width, but rather can be met by any linear portion of a structure or portion which projects generally to a line. For instance, the receiving tube lip 26 may in fact be cylindrical on each of the four sides, but it still presents flats in a rear elevational view and thus makes contact along the planar surfaces of the top flange 20 and the bottom flange 22.

The side arm 38 carries a structure which receives and supports a socket 40 of the electrical connection between the towed vehicle and the towing vehicle. In the preferred usage orientation shown in FIGS. 5 and 6, the side arm 38 extends off the left side of the receiving tube 16, at the elevation of the top of the receiver tube lip 26. In an alternative usage orientation (not shown), the bracket 10 is turned 180° so the side arm 38 extends off the right side of the receiving tube 16, at the elevation of the bottom of the receiver tube lip 26. The length of the side arm 38 is selected as needed for the desired right to left positioning of the electrical socket mounting. In the preferred embodiment of FIGS. 1-6, the side arm 38 has a length of a little more than three inches beyond the receiving tube opening 14.

The side arm 38 includes structure adapted for mounting of an electrical socket 40 thereto. In the preferred embodiment shown in FIGS. 1-6, this structure includes two bolt holes 42 on opposite sides of a socket positioning opening 44. The socket positioning opening 44 is sized to mate with the side profile of a known electrical socket 40 for hitches, such as a 4-way (not shown) or 5-way flat socket 40. The opening 44 could alternatively be sized to mate with any other standard socket or plug of a trailer electrical connection, and the term "socket" as used herein should be construed to mean either a "socket" end or a "plug" end of an electrical connection. This 5-way flat socket 40 includes a shoulder 46 which mates into and resides within the socket positioning opening 44 during use of the bracket 10. An additional mounting plate 48 is provided, together with two nuts 32 and bolts 50, to secure the shoulder 46 of the 5-way flat socket 40 into the socket positioning opening 44. The preferred mounting plate 48 thus includes identically sized and spaced openings to the bolts holes 42 and the socket positioning opening 44 of the side arm 38. In use, the mounting plate 48 can be either used below the side arm 38 as shown, or alternatively above the side arm 38 to attach the socket 40 to the top of the side arm 38 if a slightly higher position for the socket 40 is more convenient. The mounting plate 48 can be stamped out of the same sheet metal and finished in the same manner as the bracket 10.

The preferred side arm 38 extends, for at least a portion of its length, in two different planes, i.e., the side arm 38 includes an extension 52 from the face 18 of the bracket 10 at the same time as it extends from the top flange 20. By including both a vertically oriented portion 52 and a horizontally oriented portion, the side arm 38 is better able to robustly absorb the wear and tear events which the electrical bracket 10 is likely to witness during years of use, such as being bumped by people or equipment during hitching and unhitching of trailers. In the preferred embodiment, with the side arm 38 extending for a total length of about 3 inches beyond the edge of the receiving tube opening 14, the vertically oriented portion 52 extends for just over an inch beyond the edge of the receiving tube opening 14. For the strongest bracket 10, the vertically oriented portion 52 should extend as far as possible without interfering with access to the socket 40 during use. Thus one alternative configuration involves running the extension 52 the full length of the side arm 38, in which case the socket 40 can only be attached in a single location above the side arm 38.

Note several features of the preferred embodiment of the invention. Firstly, the electrical mounting bracket 10 can be installed very quickly, such as in about five minutes, without requiring any drilling or removal of an existing hitch 34. The bracket 10 is a separate component from the hitch 34, and thus can be replaced separately or moved from vehicle to vehicle separately from the hitch 34. Secondly, the attachment point for the bracket 10 is the hitch receiver tube 16 immediately around its opening. This location is nearly universally available on a wide variety of hitches that are on the market or in use today, with a relatively tight tolerance in size and location. In contrast, the size and shape of other areas of the hitch structure 34 can differ much more widely from vehicle to vehicle or from manufacturer to manufacturer. Thirdly, the bracket 10 positions the socket 40 at an ideal location, essentially at the same fore/aft location as the end of the receiver tube 16 and at roughly the same elevation as the top of the receiver tube 16, spaced just a couple of inches to the left of the receiver tube 16. The socket 40 is easier to access than if were positioned lower or further forward on the hitch structure 34. The socket 40 is also generally located closer to the receiver tube 16 than exhaust pipe locations on the vast majority of towing vehicles, so the electrical connections do not overheat from the exhaust temperatures and so users are less likely to burn themselves on hot exhaust parts during disconnection of the trailer from the towing vehicle. Fourthly, the connection/disconnection direction of the socket 40 is parallel to the axis of the receiver tube opening 14, which generally matches the fore/aft direction of the towing vehicle. This connection/disconnection direction makes intuitive sense to a user, matching the direction that they insert the ball mount or similar structure into the receiver tube 16. Finally, the preferred bracket 10 is formed merely by stamping and bending sheet metal, providing a low cost, robust solution.

FIGS. 7-12 show a second preferred embodiment of the present invention. As drawn, this embodiment 54 corresponds to a 2×2 inch receiver tube 16, with a total height of the bracket 54 being about 3.3 inches (about a 3.1 inch gap 24 around the top and bottom lip 26 of the receiving tube 16) and a total width of the bracket 54 being about 10 inches. In this embodiment, the socket receiving structure is intended for use with either or both of a towing vehicle (socket) end of a 7-way round RV blade wiring connector 56 and a 4-way or 5-way flat wiring connector socket 40 (both shown in FIGS. 11 and 12). RV socket openings 58 are provided in the side arm 38 of the bracket 54, again orienting the connection/disconnection direction parallel to the receiver tube 16, in the fore-aft direction of the towing vehicle. In this configuration, both the vertically oriented face extension 52 and the horizontally oriented top flange 20 extend for the full width of the bracket 54, i.e, for about 7 inches past the edge of the receiver tube opening 14. Alternatively, the mounting flange for the socket 56 could extend downward off the opposing (leading) side of the top flange 20. While such an embodiment places the socket in a more protected location closer to the towing vehicle, it adds slight difficulty to the manufacturing process to bend the flat plate into four sides.

Instead of orienting the 4-way or 5-way flat wiring connector socket 40 horizontally as in the embodiment of FIGS. 1-6, the 4-way or 5-way flat wiring connector socket 40 is oriented vertically. This is achieved with a third bend 60 in the stamping, this bend 60 being oriented vertically to define a side flange 62. A tab 64 extends to the same plane as the outer face of the side flange 62 for holding the 4-way or 5-way flat wiring connector socket 40.

Figure 16:
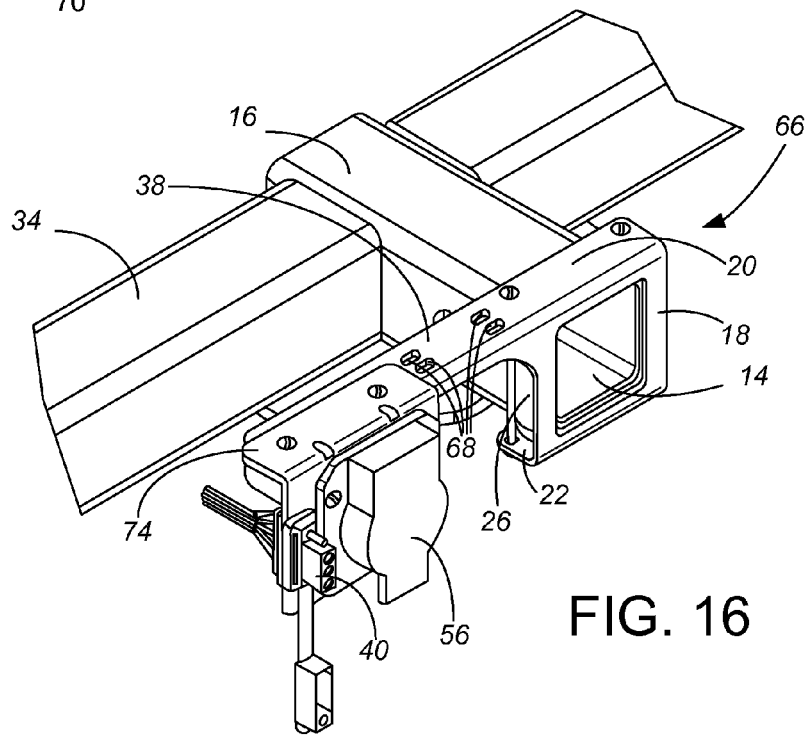

A third embodiment of the present invention is depicted in FIGS. 13-16. This embodiment is a universal electrical bracket 66, in which the top flange 20 extends in a cantilevered fashion to provide a number of mounting holes 68 in the side arm 38. As shown in FIGS. 16-18, these mounting holes 68 are used to hold any of several options for an electrical connection piece 70, 72, 74.

It will be understood that numerous modification to the dimensions specified and the shape of the electrical mounting configuration can be used to achieve the desired cantilevered mounting arrangement, including right and left arrangements. By having the electrical connections cantilevered away to the side from the receiving tube 16, they are in a convenient and accessible location for plugging and unplugging the electrical connections regardless of whether the receiving tube 16 already contains the ball mount structure (not shown) or not. At the same time, the location relative to the receiving tube 16, just a few inches off to the side, is at a convenient height and a location protected by the receiving tube 16 so the mounting bracket 10, 54, 66 is less likely to be bent during hitching and unhitching of the trailer. The selection between right and left cantilevering can be made on other factors, such as the location of the exhaust on the towing vehicle. The mounting bracket 10, 54, 66 can be quickly and easily assembled and disassembled off the receiver tube 16.

Although the present invention has been described with reference to preferred embodiments, workers skilled in the art will recognize that changes may be made in form and detail without departing from the spirit and scope of the invention.

The invention claimed is:
1. An electrical mounting bracket comprising:
a receiving tube opening sized and shaped to allow access therethrough to an interior of a hitch receiving tube, the interior of the hitch receiving tube defining a generally horizontally extending recess for longitudinally receiving a removeable hitching structure, the horizontally extending recess defining a hitch receiving tube axis;
a first flange for abutting a first exterior flat of the hitch receiving tube;
a second flange opposing the first flange, the second flange for abutting a second exterior flat of the hitch receiving tube;

a side arm extending in a cantilevered fashion in a sideways direction away from the receiving tube opening; and
a mounting structure adapted for receiving an electrical socket of a towing vehicle electrical connection on the side arm at a cantilevered location displaced sideways relative to the receiving tube opening, the mounting structure defining a direction of socket connection/disconnection which is parallel to the hitch receiving tube axis.

2. The electrical mounting bracket of claim 1, wherein the first flange and the second flange comprise two pairs of aligned bolt holes to receive two bolts to secure the electrical mounting bracket around the hitch receiving tube with a bolt on each side of the hitch receiving tube.

3. The electrical mounting bracket of claim 1, wherein the first flange and the second flange have a gap selected from the group consisting of about 2.225 inches and about 3.1 inches, wherein the first flange is spaced to contact with a first lip flat and the second flange is spaced to make contact with a second lip flat of a standardly sized hitch receiving tube.

4. The electrical mounting bracket of claim 3, further comprising:
a pair of bolt holes in the first flange which are aligned with a pair of bolt holes in the second flange; and
two bolts which extend through the bolt holes between the first and second flange, the two bolts being configured to tighten the electrical mounting bracket around the lip of the standardly sized hitch receiving tube.

5. The electrical mounting bracket of claim 1, wherein the first flange is a top flange and wherein the second flange is a bottom flange.

6. The electrical mounting bracket of claim 5, wherein the side arm comprises a horizontally extending surface as a continuation of one of the top flange and the bottom flange.

7. The electrical mounting bracket of claim 1, wherein the side arm comprises a socket receiving opening.

8. The electrical mounting bracket of claim 7, wherein the side arm further comprises a plurality of bolt holes around the socket receiving opening, and wherein the electrical mounting bracket further comprises a socket clamp mountable to the side arm using the plurality of bolt holes, such that the socket clamp and the socket receiving opening are jointly configured to hold an electrical socket.

9. The electrical mounting bracket of claim 1, formed by stamping out of sheet metal and bending.

10. An electrical mounting bracket comprising:
a receiving tube opening sized and shaped to allow access therethrough to a hitch receiving tube;
a first flange for abutting a first flat of the hitch receiving tube;
a second flange opposing the first flange, the second flange for abutting a second flat of the hitch receiving tube;
a side arm extending in a cantilevered fashion away from the receiving tube opening; and
a mounting structure adapted for receiving an electrical socket of a towing vehicle electrical connection on the side arm at a cantilevered location relative to the receiving tube opening;
wherein at least one of the first flange and the second flange comprise a lip receiving slot for receiving a lip of the hitch receiving tube.

11. An electrical mounting bracket comprising:
a receiving tube opening sized and shaped to allow access therethrough to a hitch receiving tube;
a first flange for abutting a first flat of the hitch receiving tube;
a second flange opposing the first flange, the second flange for abutting a second flat of the hitch receiving tube, wherein the first flange and the second flange have a gap selected from the group consisting of about 2.225 inches and about 3.1 inches, wherein the first flange is spaced to contact with a first lip flat and the second flange is spaced to make contact with a second lip flat of a standardly sized hitch receiving tube;
a pair of bolt holes in the first flange which are aligned with a pair of bolt holes in the second flange;
a side arm extending in a cantilevered fashion away from the receiving tube opening;
a mounting structure adapted for receiving an electrical socket of a towing vehicle electrical connection on the side arm at a cantilevered location relative to the receiving tube opening; and
two bolts which extend through the bolt holes between the first and second flange, the two bolts being configured to tighten the electrical mounting bracket around the lip of the standardly sized hitch receiving tube;
wherein the electrical mounting bracket comprises a face, wherein the two bolts are spaced wider than the receiving tube opening by a distance of about ⅓ inch on each side and offset from the face by a distance of about ⅔ inch, such that the two bolts interfere with the lip of the standardly sized hitch receiving tube to prevent the electrical mounting bracket from being pulled off the receiving tube.

12. An electrical mounting bracket comprising:
a receiving tube opening sized and shaped to allow access therethrough to a hitch receiving tube;
a first flange for abutting a first flat of the hitch receiving tube;
a second flange opposing the first flange, the second flange for abutting a second flat of the hitch receiving tube;
a side arm extending in a cantilevered fashion away from the receiving tube opening; and
a mounting structure adapted for receiving an electrical socket of a towing vehicle electrical connection on the side arm at a cantilevered location relative to the receiving tube opening; and
a face which encircles the receiving tube opening.

13. An electrical mounting bracket comprising:
a receiving tube opening sized and shaped to allow access therethrough to an interior of a hitch receiving tube, the interior of the hitch receiving tube defining a generally horizontally extending recess for longitudinally receiving a removeable hitching structure;
a first flange for abutting a first exterior flat of the hitch receiving tube, wherein the first flange is a top flange;
a second flange opposing the first flange, the second flange for abutting a second exterior flat of the hitch receiving tube, wherein the second flange is a bottom flange;
a side arm extending in a cantilevered fashion in a sideways direction away from the receiving tube opening, wherein the side arm comprises a horizontally extending surface as a continuation of one of the top flange and the bottom flange, wherein the side arm further comprises a vertically extending surface as a continuation of a front face of the electrical mounting bracket around the receiving tube opening; and
a mounting structure adapted for receiving an electrical socket of a towing vehicle electrical connection on the side arm at a cantilevered location displaced sideways relative to the receiving tube opening.

14. An electrical mounting bracket comprising:
a receiving tube opening sized and shaped to allow access therethrough to a hitch receiving tube;

a first flange for abutting a first flat of the hitch receiving tube;

a second flange opposing the first flange, the second flange for abutting a second flat of the hitch receiving tube;

a side arm extending in a cantilevered fashion away from the receiving tube opening, wherein the side arm comprises a socket receiving opening, wherein the side arm further comprises a plurality of bolt holes around the socket receiving opening, and wherein the electrical mounting bracket further comprises a socket clamp mountable to the side arm using the plurality of bolt holes, such that the socket clamp and the socket receiving opening are jointly configured to hold an electrical socket, wherein the socket clamp and the socket receiving opening are jointly configured to hold the electrical socket oriented such that a direction of socket connection/disconnection is parallel to an axis of the receiving tube opening; and a mounting structure adapted for receiving an electrical socket of a towing vehicle electrical connection on the side arm at a cantilevered location relative to the receiving tube opening.

15. The electrical mounting bracket of claim 14, wherein the elevation of the socket clamp and the socket receiving opening place the electrical socket such that the elevation of the electrical socket matches the elevation of the receiving tube opening.

16. A method of using an electrical mounting bracket, comprising:

placing an electrical mounting bracket onto a hitch receiving tube, such that a receiving tube opening of the electrical mounting bracket is positioned and sized to allow access therethrough to an interior of the hitch receiving tube, the interior of the hitch receiving tube defining a generally horizontally extending recess for longitudinally receiving a removable hitching structure, with a first flange of the electrical mounting bracket abutting a first exterior flat of the hitch receiving tube and a second flange of the electrical mounting bracket abutting a second exterior flat of the hitch receiving tube opposite the first flange, the first flange and the second flange interacting with the hitch receiving tube to support a moment of a side arm extending in a cantilevered fashion in a sideways direction away from the receiving tube opening;

tightening the electrical mounting bracket onto the hitch receiving tube using bolts extending through the first and second flanges on opposing sides of the hitch receiving tube; and securing an electrical socket of a towing vehicle electrical connection to a mounting structure on the side arm at a cantilevered location displaced sideways relative to the receiving tube opening, wherein the electrical socket is secured such that a direction of socket connection/disconnection is parallel to an axis of the hitch receiving tube.

\* \* \* \* \*